Figure 2:
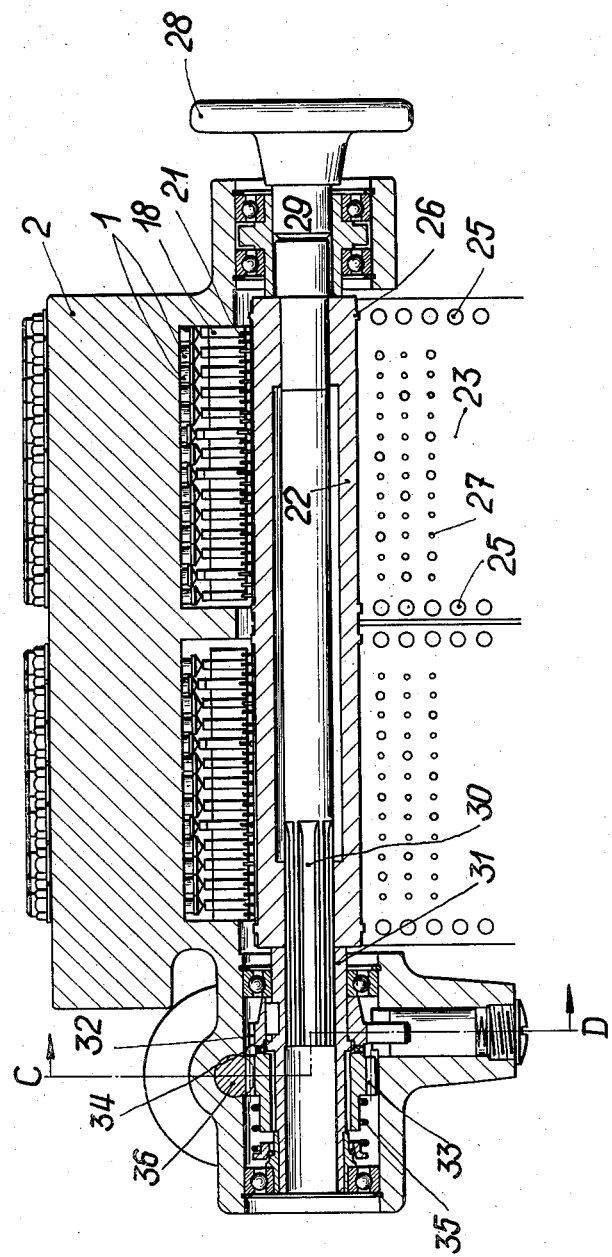

March 7, 1961　　　A. MOOSMANN　　　2,973,648
PNEUMATIC CONTROL SYSTEM FOR PRODUCTION
MACHINES, ESPECIALLY FOR MACHINE TOOLS
Filed Sept. 9, 1955　　　　　　　　7 Sheets-Sheet 1
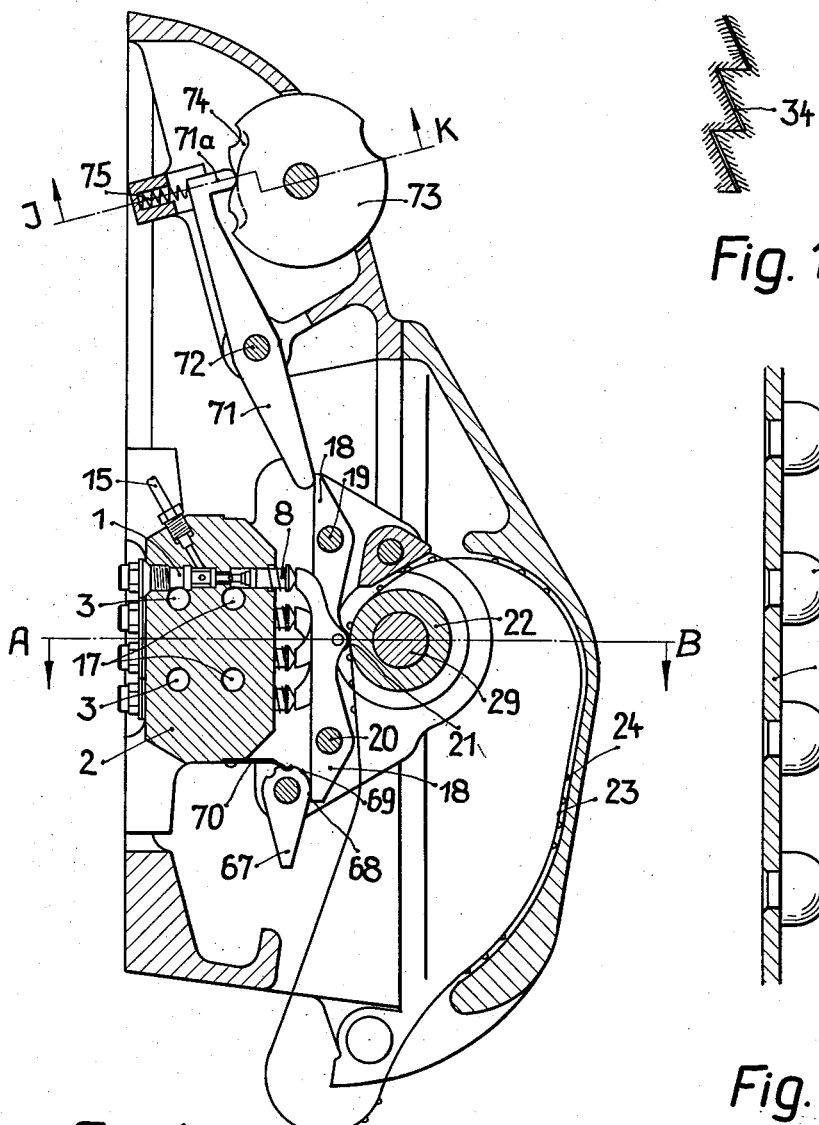
Fig. 1
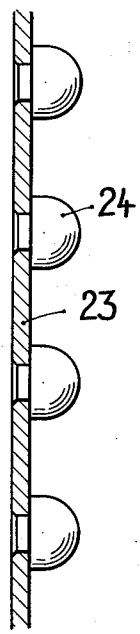
Fig. 11
Fig. 12
Inventor
Alois Moosmann
By
Atty.

Inventor
Alois Moosmann
By [signature]
Atty.

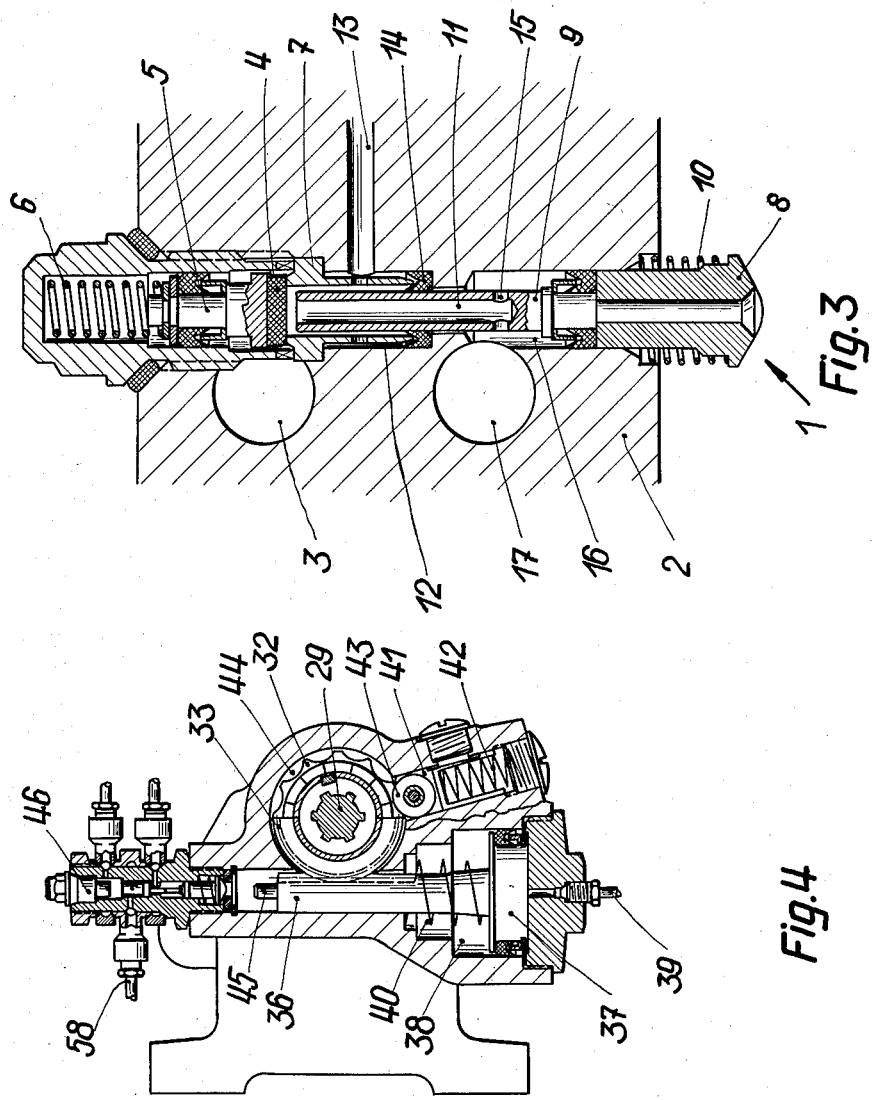

Inventor
Alois Moosmann
By
Gustav H ___
Atty

March 7, 1961 A. MOOSMANN 2,973,648
PNEUMATIC CONTROL SYSTEM FOR PRODUCTION
MACHINES, ESPECIALLY FOR MACHINE TOOLS
Filed Sept. 9, 1955 7 Sheets-Sheet 5

Inventor
Alois Moosmann
By
Gustav H. Emery
Atty.

United States Patent Office 2,973,648
Patented Mar. 7, 1961

2,973,648

PNEUMATIC CONTROL SYSTEM FOR PRODUCTION MACHINES, ESPECIALLY FOR MACHINE TOOLS

Alois Moosmann, 11 Jahnstrasse, Stuttgart-Birkach, Germany

Filed Sept. 9, 1955, Ser. No. 533,375

Claims priority, application Germany Sept. 13, 1954

7 Claims. (Cl. 74—1)

The invention relates to a pneumatic control for production machines, in which a number of operations are to take place in a predetermined sequence for carrying out a production cycle. The invention is more particularly concerned with the automatic control of machine tools by means of a compressed air controller, such as, for example, the control of automatic lathes, milling machines, boring mills or the like. However, the control system may also be used for other production machines, such as, for example, textile machines, packing machines or other machines in which a plurality of working operations are carried out in succession.

It is known to control machine tools or the like either mechanically by means of cam discs, cam plates and the like, or hydraulically or electrically in known manner. Whereas the purely mechanical control is to be considered as obsolete, the electrical control systems have the disadvantage that they take up considerable space and are expensive. The hydraulic control systems require comparatively large cross-sections for the pipe lines and valves. Furthermore, the conventional distributing slide valves of the hydraulic control systems are very costly owing to the extremely high precision required. Apart from this, the functioning speed of a hydraulic control system is dependent on the viscosity of the oil, which increases and decreases with the temperature thereof.

The invention has for its object to provide an automatic control system for machine tools or other production machines, the said system operating with compressed air and obviates the disadvantages of the mechanical, electrical or hydraulic control arrangements. To this end, a programme controller is provided according to the invention, while according to a further development thereof, the said controller advantageously cooperates with a centralising controller. The programme controller and the centralising controller may be constructed as separate appliances or may be organically assembled to form a single appliance. In both cases, the appliances cooperate in their functions in order that the desired automatic control of the machine is produced pneumatically.

The pneumatic programme controller according to the invention is essentially characterised in that the separate operations of the machine are controlled by a tape made of steel or other material which is adapted to be advanced, preferably in individual increments or stages and which is provided with projections or depressions or also perforations following one another in the sequence of the production cycle of the machine, the said projections or the like acting on the actuating elements of compressed air valves, by which in their turn those compressed air lines leading to the associated operating points of the machine are connected to a source of compressed air or to the atmosphere.

The control tape is preferably led over a rotatable sprocket roller, the advance of which is effected by pressure impulses which are generally automatically initiated with the completion of the individual operations, for example, by the relevant controlled elements of the machine itself.

In order that the programme controller is actuated in the correct order, it is proposed according to a further essential feature of the invention to provide a centralising controller, by which any desired number of pneumatic impulse lines, which come from the different impulse emitters to the machine which is to be controlled, are conducted to one specific line. This centralising controller preferably cooperates with impulses plungers, which are so arranged that they are able to operate on a common impulse-emitting valve.

Further features of the invention are hereinafter more fully explained with reference to the drawing, one constructional form of the said invention being illustrated by way of example therein.

Figure 5:
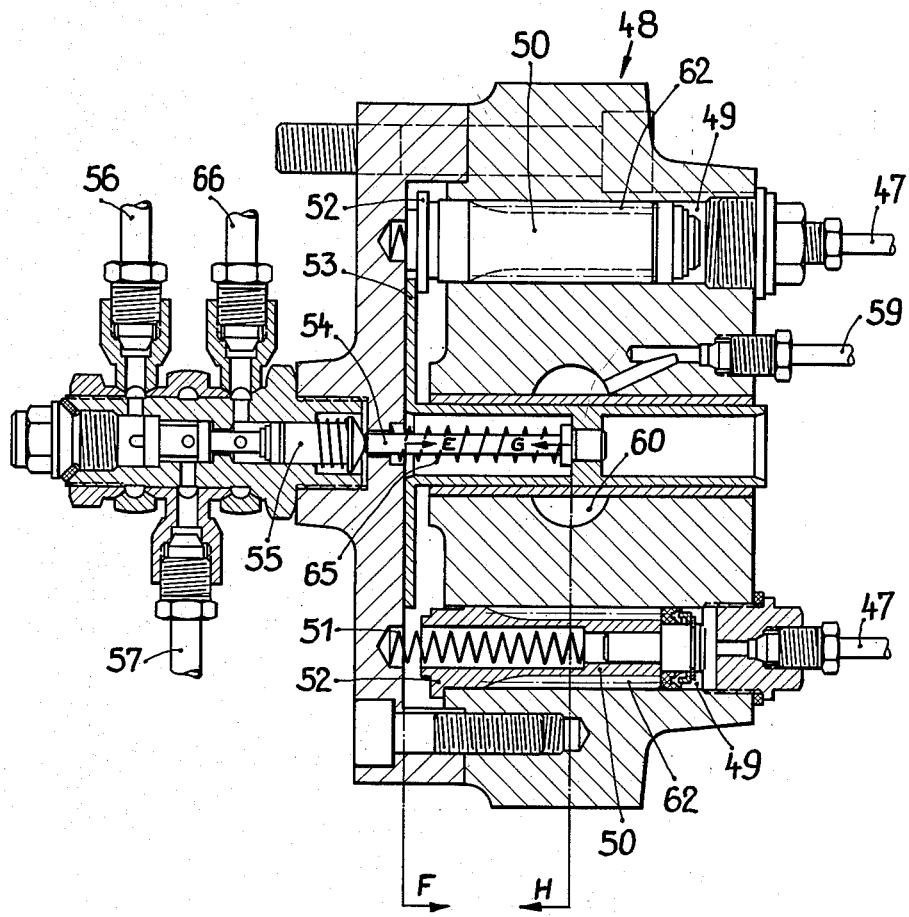
Figure 6:
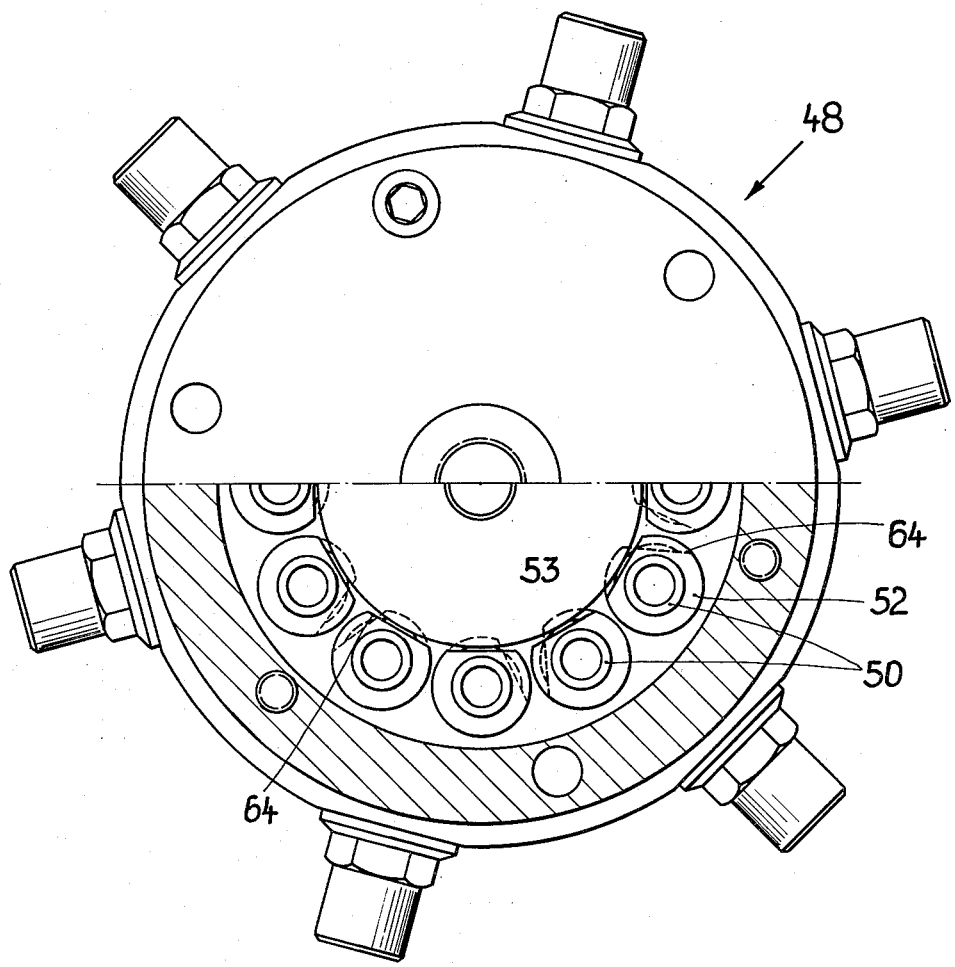
Figure 7:
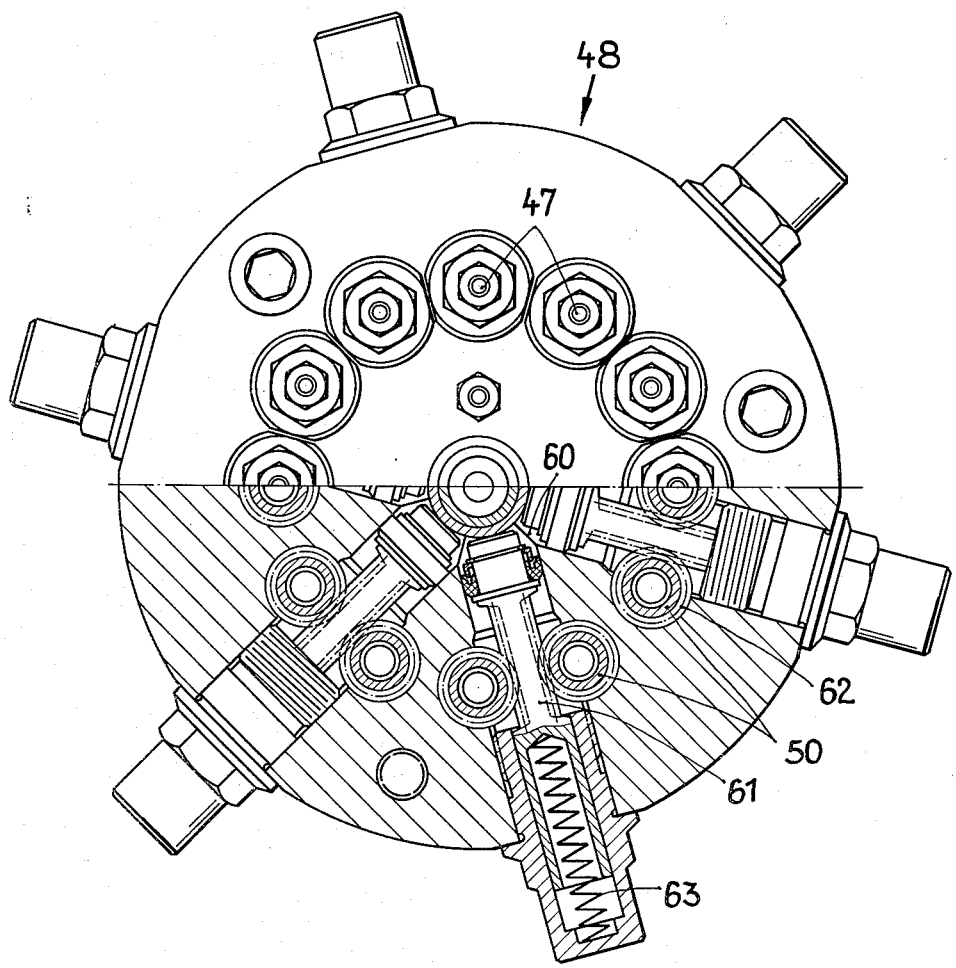
Figure 9:
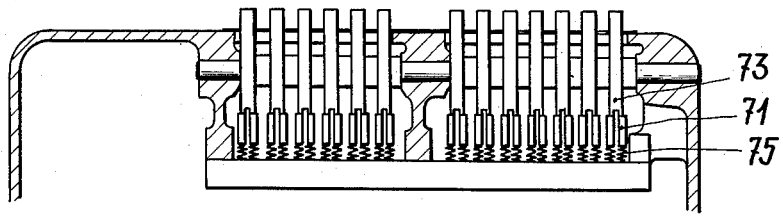
Figure 8:
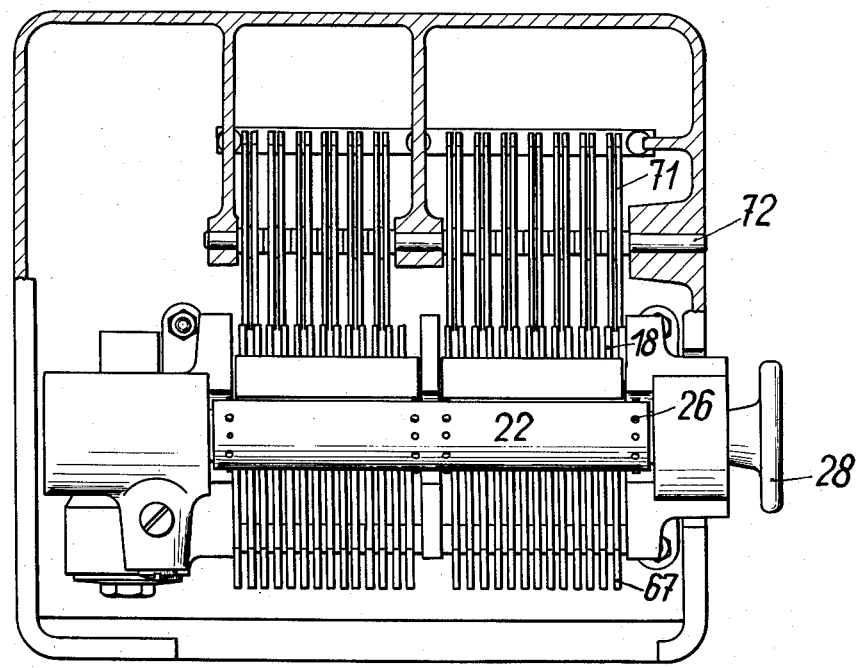
Figure 10:
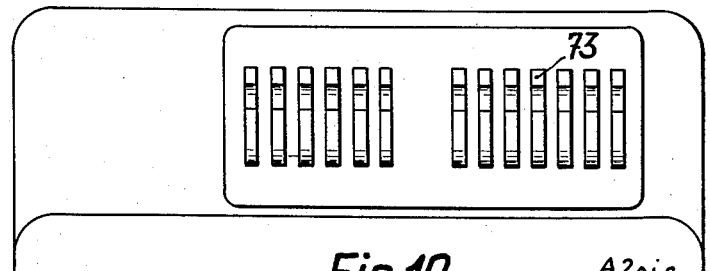

In the drawing:

Figure 1 is a cross-section of a programme controller according to the invention, Figure 2 shows the programme controller as a section on the line A—B of Figure 1, Figure 3 is a longitudinal section on an enlarged scale of one of the valves of the programme controller, Figure 4 is a section on the line C—D of Figure 2, taken through the step-by-step shift mechanism, Figure 5 is a longitudinal section of a centralising controller according to the invention, Figure 6 shows the centralising controller, partly in front elevation and partly in section on the line E—F of Figure 5, Figure 7 shows the centralising controller, partly in rear elevation and partly in section on the line G—H of Figure 5, Figure 8 is a plan view, partly in section, showing an installed programme controller, Figure 9 is a longitudinal section on the line J—K of Figure 1, taken through the manual actuating means of the programme controller, Figure 10 is a plan view of the manual actuating means of the programme controller, Figure 11 is a view on an enlarged scale showing a part of the toothing of the step-by-step shift mechanism, and Figure 12 is a fragmentary longitudinal section on an enlarged scale through the steel tape of the programme controller.

The programme controller has any desired number of separate valves 1, of which one is shown in Figure 3. All these valves 1, for example, fifty-four of them in all, are arranged in a valve block 2 of the programme controller.

The valves are supplied with compressed air through a bore 3. In the position shown in Figure 3, the valve is closed, that is to say, a valve plate 4 which consists of an elastic material such as rubber and which is connected to a valve stem 5 by vulcanisation, is urged by a spring 6 and compressed air against the sealing rim of a valve seat 7. In this position, no air is able to pass through the valve. However, if a force is caused to act on the valve lifter 8 and thus on a valve stem 9, the latter is first of all caused to bear on the valve plate 4. If a further displacement then occurs, the valve stem 9 lifts the valve plate 4 from its seat against the action of the spring 6.

As the valve stem 9 is forced on to the valve plate 4, a bore 11 in the valve stem is first of all closed, this being effected before the valve plate 4 is lifted from its seat. After lifting the said valve plate, compressed air flows from the bore 3 into a chamber 12 and thus into the bore 13. The bore 13 is in communication with a pipe connection 15 (Figure 1), which leads to one of the operating points on the machine to be controlled. The valve stem 9 is sealed off by a sleeve packing 14.

If the operation or function caused by the pressure in the pipe connection 15 should be completed, the pressure acting on the valve lifter 8 must be removed, so that the valve stem 9 can be moved back to its original position. For this purpose, the valve plate 4 is first of all forced back on to its seat 7 again by the action of the spring 6, whereby the flow of compressed air from the bore 3 is stopped. With continued movement of the valve stem 9 under the action of the spring 10, the valve stem 9 is lifted from the valve plate 4. By this means, the chamber 12 is brought into communication with the bore 11 of the valve stem and by way of the radial bores 15 with the chamber 16, which is connected to the venting passage 17 through which the air is able to escape to atmosphere.

Each element or member of the machine to be controlled and which carries out one function or one operation, is associated with such a valve 1 in the programme controller. The 54 valves provided in the constructional example are arranged in four rows in the valve block 2, each two rows being connected to a common compressed air bore 3 and an exhaust air bore 17. The valve lifters 8 are each actuated by a lever 18. For constructional reasons, the levers 18 are alternately rotatably mounted on a spindle 19 or on a spindle 20. Suitable levers in two different lengths come from each side, each of them operating one row of valves 1. Rotatably mounted on the back of each lever 18 is a roller 21.

A sprocket roller 22 is rotatably mounted in front of the levers 18. Guided over this roller is a steel tape 23, which is provided with embossing, depressions or other irregularities, preferably with protuberances 24 in the manner of rivet heads. When such a protuberance 24 comes in front of the roller 21 of a lever 18, the latter is forced back through the roller 21 by the height of the protuberance 24, whereby the associated valve 1 is opened. The steel tape 23 has two rows of perforations 25 which are engaged by sprockets 26 of the shift roller 22, so that the steel tape is fed forward corresponding to the rotation of the roller 22 in the manner of a film.

In the constructional example, two steel tapes 23 are provided in juxtaposition on a common shift roller 22. It is alternatively possible to use more than two steel tapes or even only one such tape. The steel tape is brazed or welded at the ends to form a continuous member, the length of which depends on the programme which is to be arranged on the tape.

The steel tape 23 also has small holes 27 arranged in rows to conform to the rollers 21, the protuberances 24 being riveted in the said holes in accordance with the control programme used at the time. The protuberances are thus fixed on the steel tape 23 in such manner that they succeed one another in the sequence of the production programme according to the required operations of the machine.

The steel tape 23 is the only element which has to be replaced with a change in the production cycle of the machine which is controlled. The steel tape can be changed in a simple manner by the shaft 29 being withdrawn towards the right (Figure 2) by means of a hand knob 28. The shift roller 2 can then be freely extracted so that a fresh steel tape can be fitted and the roller reinstalled.

By means of a square section 30, the shaft 29 connects the roller 22 to a boss 31, which is rotatably mounted in the housing. Mounted on the boss 31 is an index wheel 32 which is secured fast to the said boss and in front of which a ratchet wheel 33 is mounted on the boss 31 so as to be rotatable and axially displaceable. Unidirectionally acting ratchet teeth 34 (Figure 11) produce in one direction a spring-loaded engagement between the ratchet wheel 33 and the index wheel 32. The ratchet wheel is under the action of a compression spring 35, which causes the interengagement of the ratchet teeth 34 axially. Acting on the ratchet wheel 33 is a rack 36, which is provided at one end with a compressed air piston 37, which is axially displaceable as a tight fit in a cylinder bore 38. If a compressed air impulse strikes the piston 37 by way of a connection 39, the said piston is displaced axially a certain amount against the action of a spring 40. Due to the engagement of the rack 36 with the ratchet wheel 33, this impulse causes the rack to turn the ratchet wheel 33 by the distance of one ratchet tooth 34 and thus the steel tape 23 is advanced by one step through the roller 22. By means of an index piston 41, which is under the action of a spring 42, a roller 43 of the index piston is forced into notches or detents 44 of the index wheel 32.

At the end of the stroke, the rack 36 bears with its pin 45 against an impulse-emitting valve 46, which in its turn causes the collapse of the pressure in the pipe line 39 in a manner to be hereinafter more fully described. With the collapse of the pressure, the piston 37 with the rack 36 is returned by the action of the spring 40 into the initial position shown in Figure 4. A fresh step-by-step movement can now be initiated.

The advancing impulses for the connection 39 come from a very wide variety of abutments and impulse emitters on the machine to be controlled. In order that all these impulses can be brought without mutual interference satisfactorily to the connection 39 and thus used for advancing the steel tape 23, a centralising controller is provided, which can either be installed in the housing 2 of the programme controller or can be separately arranged. One constructional example of the centralising controller is shown in Figures 5, 6 and 7.

By means of unions 47 (of which there are twelve in this example) the compressed air impulses reach the centralising controller 48 from the different impulse emitters and abutments on the machine to be controlled. The arriving impulse always fills the corresponding chamber 49 with compressed air and thereby displaces a piston or plunger 50 against the action of a spring 51. The plunger 50 is provided with a collar 52, which engages beneath a valve plate 53 and moves the latter with the impulse stroke of the plunger 50. The valve plate 53 is in its turn fitted with a pushrod 54, which acts on an impulse valve 55. The impulse valve 55 is supplied with compressed air through the union 56. As soon as an actuation of the impulse valve 55 takes place in the manner described with the arrival of an impulse by way of the union 47, pressure is applied to the union 57. The latter is in turn connected to the union 39 of the programme controller (Figure 4). The arriving impulse causes an advancing step of the rack 36 in the manner described.

Finally, the pin 45 of the rack 36 is urged against the impulse valve 46, which supplies an impulse to a union 59 of the centralising controller by way of the union 58. This incoming impulse reaches an annular chamber 60 and forces the radial toothed pistons 61 outwardly. These pistons 61 mesh with a toothed portion 62 of the impulse plunger 50. At the level of the collar 52, the impulse plungers 50 are formed with "flats" 64, which are turned by the stroke of the toothed piston 61 in such manner that they face the periphery of the valve plate 53, as shown in Figure 6. As soon as this position is reached, the valve plate 53 is able to fall back into its initial position under the action of a spring 65. The piston 50 just acted upon can now maintain its advanced position without interference under the action of the compressed air in the chamber 49 as long as its impulse is operative. The other eleven plungers are ready for operation.

As soon as the valve plate 53 has dropped back to its original position, the action of the impulse valve 55 is broken, the compressed air of the pipe line 56 is shut off and the pipe line 57, which has passed the impulse into the programme controller, is brought into communication with an air-venting connection 66. By this means, the pipe 57 with the union 39 on the programme controller is vented, and the piston 37 can fall back into its original position under the action of the spring 40. The pin 45 of the rack 36 then releases the impulse valve 46, so that this may also be vented and the line 59 is then without pressure.

The radial toothed pistons 61 are now turned back into their original positions by the springs 63. The collars 52 of the impulse plungers 50 engage under the valve plate 53. If a fresh impulse is now supplied through another union 47, the same process is repeated. Those impulse plungers 50 which are not able to return under the action of their springs 51 owing to the pressure still obtaining in the chamber 49 bear with their flattened portions on the periphery of the valve plate 53 with the collapse of the pressure in the annular chamber 60 until, with the cessation of the corresponding impulse, for example, when the carriage of a lathe moves away from a stop, or due to any other process, the air pressure in the chamber 49 collapses. Then this piston is also ready for operation again.

When setting up a machine for automatic operation, it is necessary that the individual movements of the machine can be initiated by hand. With the present invention, this is possible in an extremely simple manner by the fact that either the roller 22 with the steel tape 23 is completely withdrawn or is rotated into a position in which none of the protuberances 24 are able to press on the rollers 21.

Instead of being actuated by the protuberances 24, the levers 18 can also be separately operated by an associated lever 67, which in its normal position bears with a flattened portion 68 against the lever 18, being rocked through about 45°, so that the periphery of the arc 69 bears against the lever and thereby deflects the latter in such manner that the associated valve 1 is actuated. A leaf spring 70 always holds the lever 67 in one of its two positions. As a result of this deflection of the lever, it is readily possible to interfere with the system of the programme controller in order to set up the machine.

In order also to be able to interfere with important functions of the programme during the running of the machine, and in order also, when setting up the machine, to obtain an even more convenient operation of the most important functions, there is further provided a series of levers 71 which are rotatably mounted on a shaft 72 and which each act on an associated lever 18 instead of the levers 67 provided on the opposite side. The actuation of the levers 71 is obtained by cam discs 73, the cams 74 of which press on the projection 71a of the levers 71. The levers 71 are urged against the cam disc 73 by a spring 75. The spring 75 also operates through the projection 71a for stopping the disc 73. The arrangement of the levers 71 in Figure 8 is shown in association with the levers 18. The arrangement of the cam discs 73 relatively to the levers 71 is illustrated in Figure 9. The well-ordered arrangement and the easy accessibility of the cam discs from outside will be seen in Figure 10. Each cam 73 co-operates with two levers 71, as will be seen from Figures 1 and 9.

The operation of an arrangement according to the invention is hereinafter explained by reference to a simple example, which shows the use of the invention for the automatic control of the turret carriage of a lathe. In this connection, all operations on the machine have been disregarded which do not concern the turret carriage.

Let it be assumed that the work spindle of the machine is running and the turret carriage is disposed in its rest position. By a brief pressing of an associated cam disc 73, the automatic working cycle for the turret carriage is initiated, this being effected by the cam disc 73 rocking a lever 71 about the shaft 72 by means of its projection 71a and thereby rocking the associated valve lever 18 about the shaft 19, whereby the associated valve 1 delivers compressed air into the corresponding pipe line 15.

In order to cause a step forward of the control tape 23, this pipe line 15 is connected to one of the unions 47 (Figure 5), so that with the above-described pressure of the cam disc 73, compressed air flows through the pipe line 47 into the chamber 49 of the centralising controller 48 and thereby displaces one of the toothed plungers 50 (of which there are, for example, twelve) against the action of the associated spring 5, whereby the plate 53 is displaced against the action of the spring 65 by means of the collar 52. The valve 55 is operated by this displacement, so that compressed air passes from the pipe line 56 into the pipe line 57. This impulse of compressed air passes through the union 39 to the piston 37 (Figure 4), which is now displaced against the action of the spring 40 and thus, by means of the rack 36, the ratchet wheel 33, the detent disc 32, the guide pin 22 and therefore the steel tape 23 are advanced by one step.

In its upper position, the pin 45 of the rack 36 presses on the impulse valve 46, which as a result introduces compressed air into the pipe line 58, which leads to the union 59 of the centralising controller 48. In the annular space 60, the said pressure impulse operates in such manner that it displaces all the radial toothed plungers 61 against the action of the springs 63, so that the flat portions 64 of the toothed pistons 50 are rotated into the position shown in Figure 6. Under the action of the spring 65, the valve plate 53 drops back into its original position. The flow of compressed air from the pipe 56 into the pipe 57 thus ceases and the pipe 57 is vented to atmosphere through the pipe 66. The piston 37 returns to its original position again under the action of the spring 40, and the ratchet wheel 33 is also returned by a meshing of the teeth 34 (Figure 11).

With the return travel of the pin 45, the valve 46 is released, so that the pipe 58 discharges its air into atmosphere. By this means, the pressure in the chamber 60 of the centralising controller is relaxed, the radial toothed pistons 61 return to their original positions again under the action of the springs 63 and thus the flattened portion 54 of each plunger 50 is again swung into the position shown in dotted lines in Figure 6, in which the collars 52 engage beneath the plates 53. By this means, both the centralising controller 48 and the programme controller 2 are prepared for the next advancing step.

The above-described advancing step has in its turn engaged the clutch for the adjustment of the turret carriage from its rest position in the direction towards the workpiece, this being effected by an associated rivet head 24 of the steel tape 23 having opened a valve 1 by means of a roller 21 and the associated lever 18 and introduced compressed air into the associated pipe line 15. The turret carriage now runs at high speed towards the workpiece until a cam provided for the purpose on the carriage strikes against an impulse-emitting valve disposed on the machine. The cam operates this valve and compressed air is thus sent to one of the twelve unions 47 of the central controller 48, whereby one step forward of the steel tape 23 is effected in the manner previously described.

The new position of the steel tape 23 causes a change by the fact that that rivet head 24 of the steel tape 23 previously in the operative position is missing in the new position, it being replaced by another rivet head which acts on a corresponding valve. That valve which just previously had caused the high-speed coupling by the supply of compressed air allows the occluded air to escape to atmosphere, and the freshly operated valve 1 supplies compressed air through an associated pipe 15 to the feeding clutch, which advances the turret carriage in the direction towards the workpiece at the feeding speed until a second cam on the turret carriage acts in the manner described above on the impulse-emitting valve which has already been mentioned and thus causes the next step forward of the steel tape 23.

In the position now being occupied by the steel tape 23, the rivet heads 24 thereon are so arranged that a clutch for "high-speed return travel" is engaged, which causes the carriage to be displaced in the direction away from the workpiece until a further cam on the carriage actuates the impulse-emitting valve. With the next forward step, the "high-speed return travel" clutch is disengaged, so that the associated compressed air valve permits the escape of the compressed air which until then was operative.

This control process is described for one movement of a turret carriage and one setting of the turret head. It is repeated for each setting of the turret head in accordance with the predetermined operations, including the reversing of the turret head, and the functions of additional elements or assemblies on the machine are controlled in the same manner by suitable rows of rivet heads on the steel tape 23.

The arrangement of the control tape 23 renders possible an extremely versatile use of the control arrangement. The changeover of the machine to another sequence of control processes is effected in the simplest possible manner by replacing the tape 23.

I claim:

1. Actuating means for selectively operating actuating elements of machine tools in which a number of operations are to be carried out in a prescribed cycle, including a plurality of compressed air valves adapted to be selectively operated by control means adapted to be advanced successively, comprising a steel tape provided with a plurality of holes, rivets in a number of the holes corresponding to the prescribed cycle of operation of the machine tool, said holes being adapted to receive said rivets permanently, said rivets having protuberances on said steel tape adapted to act on rotatably mounted levers having rollers on its back, said rollers being adapted to co-operate with said protuberances of said rivets, said steel tape being provided with a row of spaced holes on each side of the tape to cooperate with a rotatable sprocket wheel to pull the steel tape along said levers, the advance of said sprocket wheel being effected by pressure impulses initiated with the completion of the individual operations of said machine tool, said pressure impulses being caused by the controlled elements of said machine tool.

2. Actuating means according to claim 1, in which at least some of said rotatably mounted levers are adapted to be manually operated at will by cam discs, the profiles of which acting on projections of double-armed levers, the opposite arms of said double-armed levers acting on said rotatably mounted levers.

3. Actuating means according to claim 1, in which said sprocket wheel is advanced by a step-by-step advancing piston adapted to deliver an advancing impulse to a ratchet wheel by way of a rack, said ratchet wheel being adapted to be coupled with said sprocket wheel by means of an index wheel.

4. Actuating means according to claim 1, in which any desired number of compressed air impulse pipes extending from different impulse emitters of said machine tool are united at one pipe of said actuating means by means of a centralising controller, said centralising controller being provided with impulse pistons on which said pressure impulses act and which, in turn, displace, by means of a collar, a common valve plate by a certain distance in such manner that all impulse pistons are able to act on a common impulse-emitting valve.

5. Actuating means according to claim 4, in which said impulse pistons of said centralising controller are provided with flattened portions on that side on which they come into contact with said common valve plate.

6. Actuating means according to claim 4, in which all impulse pistons are adapted to be turned simultaneously by toothed pistons by means of meshing teeth in such manner that said flattened portions turn towards the periphery of said valve plate so that the latter can drop past the said flat into its original position, said radial toothed pistons, after the common cylinder chamber has been vented, being rotated back by a spring into their original positions.

7. Actuating means according to claim 6, in which said rack in its stepped advance actuates an impulse-emitting switch which, after completion of a step, acts through one of said toothed pistons in such manner on said centralising controller that the action of the preceding impulse is cancelled out if it is still operative.

References Cited in the file of this patent

UNITED STATES PATENTS

| | | |
|---|---|---|
| 1,676,803 | Russen | July 10, 1928 |
| 2,035,083 | Mattern | Mar. 24, 1936 |
| 2,328,475 | Lockman | Aug. 31, 1943 |
| 2,564,228 | Pitney | Aug. 14, 1951 |
| 2,579,998 | Bullard et al. | Dec. 25, 1951 |
| 2,770,145 | Stibitz | Nov. 13, 1956 |
| 2,799,171 | Stibitz | July 16, 1957 |

FOREIGN PATENTS

| | | |
|---|---|---|
| 3,439 | Great Britain | A.D. of 1881 |